United States Patent Office 3,121,671
Patented Feb. 18, 1964

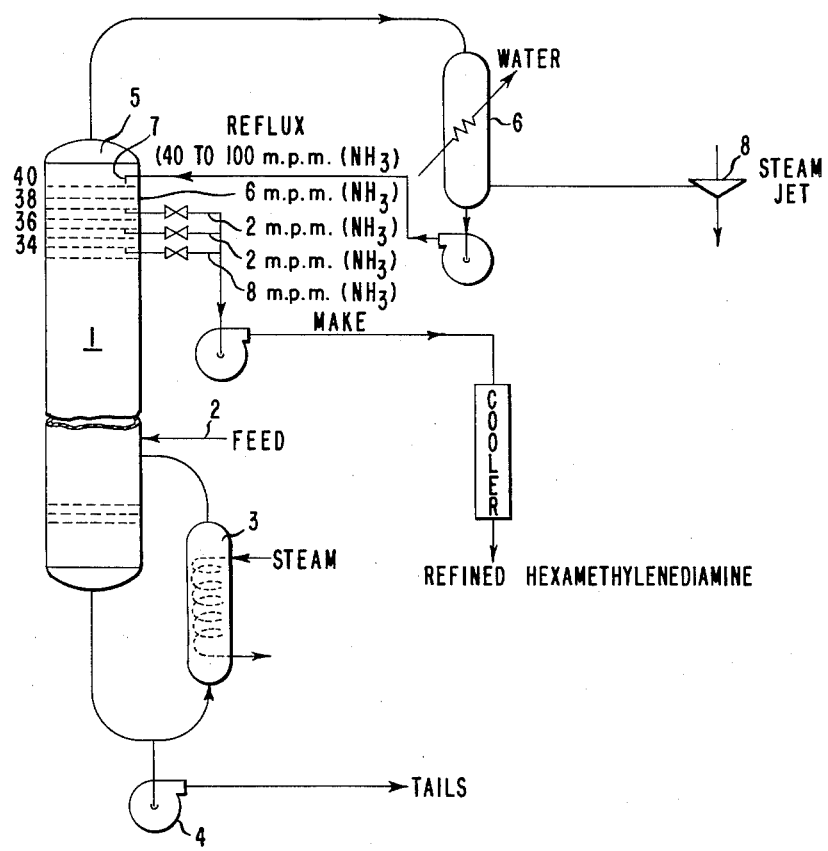

3,121,671
PRODUCTION OF HIGHLY REFINED
HEXAMETHYLENEDIAMINE
James Turnley Lassiter, Orange, Tex., assignor to E. I. du Pont de Nemours and Company, Wilmington, Del., a corporation of Delaware
Filed Apr. 26, 1961, Ser. No. 105,595
2 Claims. (Cl. 202—52)

This invention concerns a method for refining hexamethylenediamine whereby hexamethylenediamine which is virtually free of dissolved ammonia is obtained.

It has long been recognized that the production of polyamide resins of highest quality requires the use of pure monomeric intermediates. Ordinary methods of purification such as distillation are insufficient, and further refinement is essential if optimum quality is to be attained. This is especially true of hexamethylenediamine, which, as a result of degradation or oxidation reactions, generates traces of ammonia during distillation.

One of the methods which has been employed for many years for removal of traces of ammonia from hexamethylenediamine has been to pass an inert gas through the semi-refined diamine, so as to strip ammonia therefrom. The disadvantages of this method are obvious, as it is costly and gives rise to physical losses. It has been reported that when moisture was present in the carrier gas, the ammonia content of the treated diamine was excessively high; this possibly was due to hydrolysis of nitrile groups, present in trace amounts as impurities.

An object of this invention is to provide a distillation method which, unlike earlier distillation methods, gives hexamethylenediamine having a sufficiently low content of dissolved ammonia to permit its use, without further refining, as an intermediate for the manufacture of optimum quality polyamide resins. Other objects will appear hereinafter.

The aforesaid objects are accomplished, in accordance with this invention, by drawing off the diamine during distillation thereof, by means of a side stream in the distillation column, at a point where the temperature is not so high that the chemical generation of ammonia occurs before the draw-off stream can be cooled, and yet high enough that the solubility is extremely low. In this way a draw-off of highly refined hexamethylenediamine of sufficient purity to be used directly in the manufacture of highest quality polyamide resins is obtained. To accomplish this result, it is important to operate within narrow limits, to avoid on the one hand the solubility effect, and on the other hand a perceptible degradation reaction.

Under the most carefully balanced conditions of continuous operation the side stream "make" can be maintained at an ammonia content below 10 mols per million mols of product (m.p.m.). Ordinary refined hexamethylenediamine has an ammonia content of from about 50 to 100 m.p.m., and by sparging with nitrogen according to prior art methods this can be reduced considerably (e.g. to about 9 parts per million by using 4.4 cu. ft. of $N_2$ per pound of hexamethylenediamine under anhydrous conditions at 50° C.).

The temperature at which the take-off stream is withdrawn in the practice of this invention is usually about 85° to 115° C., with about 115° C. as an optimum. In some instances, the effective minimum draw-off temperature can be as low at about 75° C.

The distillation column operates at diminished pressure, which, if desired, is maintained at a level of about 25 to 100 mm. of Hg by means of a steam jet. In practice, the distillation column contains a sufficiently large number of plates and possible draw-off levels, to allow some flexibility in the operating conditions, but the selection of the level which produces the most outstandingly pure diamine, is in general, as indicated above.

The operation of the invention is illustrated in the accompanying schematic drawing, which shows a refining column 1, into which is fed hexamethylenediamine at the inlet point 2. The liquid diamine is heated by circulating it through a steam heater 3, provision being made for pumping off a purge of tails (including high boiling impurities) by means of the pump 4. The column is filled with suitable packing, or plates in the form of trays, as for example the numbers 34, 36, 38 and 40 indicating the number of plates, or draw-off trays, counting from the base of the column. The vapors which leave the top section of the column 5 are cooled indirectly by cold water in the condenser 6 and pumped back as reflux over the top plate 7, where the ammonia content is relatively high (e.g. 60 m.p.m.), and the temperature is about 55° to 70° C. If desired, an ammonia-rich purge may be removed from the condensate, and sent to a topping still (not shown) which produces a foreshot adapted to recycling to the hexamethylenediamine production train (also not shown), but from an economic standpoint it is usually not essential to recover and recycle the hexamethylene diamine in this manner. Preferably, a steam jet 8 is used for maintaining the low pressure, and for disposal of the ammonia-rich purge. A few plates below the top of the column the temperature is 85° to 115° C., and the ammonia content is usually close to about 2 m.p.m. Take-off can be made at still lower plates, but it is not preferred to draw off liquid at temperatures above 115° C. in most instances.

The residence time at the draw-off temperature must be short, i.e. not more than about 2 to 5 minutes. To avoid generation of ammonia the refined diamine is conducted through a cooler 9, where the temperature is immediately decreased to below 55° C.

A series of runs was made as above described with the results shown in the following table.

TABLE I

*Distribution of Hexamethylenediamine Impurities in the Refining Column*

| Example No. | Ammonia (m.p.m.) | | | | |
|---|---|---|---|---|---|
| | Top Plate | Plates below top plate | | | |
| | | 2 | 4 | 6 | 8 |
| 1 | 44 | 6 | 2 | 2 | 7 |
| 2 | 46 | 1 | 2 | 1 | 4 |
| 3 | 41 | 3 | 3 | 3 | 3 |
| 4 | 56 | 4 | 7 | 4 | 3 |
| 5 | 69 | 3 | 6 | 4 | 5 |
| | Nitrile [1] (m.p.m.) | | | | |
| 4 | 6 | 1 | 2 | 2 | 2 |
| 5 | 3 | 2 | 1 | 1 | 1 |
| 6 | 1 | 1 | 1 | 1 | 2 |

[1] Possibly aminocapronitrile.

The following Table shows the results obtained under the same conditions, over a 23-day period of operation. In the table, the analyses given are for the product withdrawn from the column at the plate where the $NH_3$ content was at a minimum (cf. the drawing), the take-off point being varied as minor changes in the feed produced corresponding variations in the distribution of impurities within the column.

TABLE II

*Ammonia Present in Refined Hexamethylenediamine Produced by Side Stream Make*

| No. of days from start of test: | NH$_3$, m.p.m. |
|---|---|
| 1 | 7 |
| 2 | 7 |
| 2 | 12 |
| 3 | 3 |
| 4 | 1 |
| 4 | 3 |
| 5 | 0 |
| 5 | 2 |
| 6 | 0 |
| 6 | 0 |
| 6 | 10 |
| 7 | 1 |
| 7 | 1 |
| 8 | 1 |
| 8 | 0 |
| 8 | 1 |
| 17 | 2 |
| 17 | 4 |
| 18 | 3 |
| 18 | 3 |
| 19 | 1 |
| 19 | 2 |
| 19 | 2 |
| 20 | 4 |
| 20 | 2 |
| 21 | 4 |
| 21 | 2 |
| 22 | 3 |
| 22 | 3 |
| 23 | 4 |
| 23 | 6 |
| 23 | 3 |

The operation was similarly continued for a considerably longer period of time, with the NH$_3$ content of the product averaging 3.5 m.p.m. The production of this refined diamine amounted to 4.5 million pounds during this test. By comparison, tests were made in the same equipment with overhead takeoff, coupled with nitrogen stripping, as in the prior art, using 0.01 cu. ft. N$_2$ per pound of diamine. Starting with the same kind of feedstock, the ammonia content of the refined product was 25.6 m.p.m., as an average, the analyses varying from 13 to 41 m.p.m. over a period of several days. To lower the ammonia content to 9 m.p.m. additional nitrogen stripping was required.

It is to be understood that the invention is highly useful as a step in the manufacture of nylon, and it is especially effective also in producing hexamethylenediamine for use as a cross-linking agent for other resins, etc.

I claim:

1. In a process for refining hexamethylenediamine in a distillation column at a distillation pressure within the range of 25 to 100 mm. of mercury, in which ammonia is continuously generated by chemical degradation, and in which an overhead stream of hexamethylenediamine vapor containing from 40 to 100 moles of ammonia per million moles of hexamethylenediamine is continuously drawn off from the top of the column, condensed, and the liquid condensate recirculated to the top of the column as reflux at a temperature in the range of 55° to 70° C., and in which high-boiling impurities are continuously removed from the stillpot by pumping off a purge of tails therefrom, and in which crude hexamethylenediamine is continuously fed to the base of the distillation column above the stillpot, the improvement of drawing off from the distillation column at a point near the top where the temperature of the reflux is from 85° to 115° C. a side stream of condensate of refined hexamethylenediamine containing ammonia at a content of less than 10 moles of ammonia per million moles of hexamethylenediamine, and immediately cooling said side stream to below 55° C. before generation of ammonia to a level in excess of 10 moles per million moles of hexamethylenediamine occurs.

2. Process of claim 1 wherein the side stream is drawn off at a temperature of 115° C.

References Cited in the file of this patent

UNITED STATES PATENTS

| | | |
|---|---|---|
| 2,081,855 | Fellows | May 25, 1937 |
| 2,095,418 | McConnell | Oct. 12, 1937 |
| 2,136,172 | Powell | Nov. 8, 1938 |
| 2,753,387 | Love | July 3, 1956 |
| 2,780,662 | Wilson | Feb. 5, 1957 |
| 2,889,256 | Campbell | June 2, 1959 |
| 2,901,405 | Venis | Aug. 25, 1959 |

UNITED STATES PATENT OFFICE
CERTIFICATE OF CORRECTION

Patent No. 3,121,671                                      February 18, 1964

James Turnley Lassiter

It is hereby certified that error appears in the above numbered patent requiring correction and that the said Letters Patent should read as corrected below.

Column 1, line 57, for "100 m.p.m." read -- 1000 m.p.m. --.

Signed and sealed this 14th day of July 1964.

(SEAL)

Attest:

ESTON G. JOHNSON                                     EDWARD J. BRENNER
Attesting Officer                                        Commissioner of Patents